United States Patent [19]

Cameron et al.

[11] Patent Number: 5,120,483
[45] Date of Patent: Jun. 9, 1992

[54] RARE EARTH BORIDE/ALUMINA COMPOSITES AND METHODS OF MAKING

[75] Inventors: Craig P. Cameron, Ellicott City, Md.; Roy W. Rice, Alexandria, Va.

[73] Assignee: W. R. Grace & Co.-Conn., New York, N.Y.

[21] Appl. No.: 679,694

[22] Filed: Apr. 3, 1991

[51] Int. Cl.$^5$ .......................... F27B 9/10; F27B 9/04; C04B 35/58; C04B 35/50

[52] U.S. Cl. .......................... 264/66; 501/96; 501/127; 501/152; 423/276; 423/289; 423/440; 264/65; 264/332

[58] Field of Search ................ 501/96, 98, 152, 153, 501/94, 126, 127; 264/65, 332; 423/289, 276, 440

[56] References Cited

U.S. PATENT DOCUMENTS

| | | | |
|---|---|---|---|
| 3,864,939 | 2/1975 | Phillips et al. | 63/32 |
| 3,955,991 | 5/1976 | Young et al. | 106/47 Q |
| 4,595,545 | 6/1986 | Sane | 264/65 |
| 4,605,634 | 8/1986 | DeAngelis | 501/96 |

Primary Examiner—William R. Dixon, Jr.
Assistant Examiner—Michael A. Marcheschi
Attorney, Agent, or Firm—Steven Capella

[57] ABSTRACT

The invention encompasses unsintered and sintered compositions comprising boride and alumina. A sintered material containing boride and alumina may be produced by a method comprising:
  a) combining sources of borate glass frit and aluminum to form a mixture;
  b) compacting the mixture to form a shape;
  c) heating the shape, whereby the sources react to form boride and alumina; and
  d) densifying the reacted shape.

Specific embodiments of the invention include the use of rare earth borate glasses such as $La_2O_3 \cdot 6 B_2O_3$ glass to form compositions containing rare earth boride.

8 Claims, No Drawings

RARE EARTH BORIDE/ALUMINA COMPOSITES AND METHODS OF MAKING

This invention was made with Government support under Contract N00014-87-C-0515 awarded by the Office of Naval Research, Dept. of the Navy. The Government has certain rights in the invention.

BACKGROUND OF THE INVENTION

Many structural ceramic materials are finding uses in situations requiring good mechanical properties or other physical properties which can not easily be provided by other types of materials. Unfortunately, use of structural ceramic materials has been limited by their high cost.

The high cost of many structural ceramics may be partly attributed to high cost of the starting ceramic powders which are to be shaped and densified to form structural ceramic parts. The starting powders are often made by energy-intensive processes or by other expensive methods adapted to produce high purity starting powders. Generally, it has been preferred to minimize the impurity contents of the starting powders in order to maximize the performance of the ultimate ceramic part.

In some instances, ceramic materials have been prepared by reaction processing wherein the starting materials include powder reactants which are reacted to form a desired ceramic composition. The ceramic composition is then fired to obtain a densified ceramic product. Fully densified ceramics are often very difficult to obtain because the original porosity of the reaction mixture combined with a density decrease from the reaction result in a low density compact. Such low density compacts are typically very difficult to sinter to full density.

Accordingly, there is a need for inexpensive structural ceramic materials and methods of making those materials, especially if one wishes to take greater advantage of ceramic properties in commercial applications.

SUMMARY OF THE INVENTION

The invention overcomes some of these problems associated with the high cost of structural ceramics. The invention encompasses unsintered and dense structural ceramic compositions comprising boride and alumina. The invention also encompasses methods of making these compositions and other boride/alumina composites from relatively inexpensive starting materials.

In one aspect, the invention encompasses methods for producing compositions containing boride and alumina, the methods comprising:
a) combining sources of borate glass frit and aluminum to form a mixture, and
b) heating the mixture whereby the sources react to form boride and alumina.

In a further aspect, the invention encompasses a method of producing a sintered material containing boride and alumina, said method comprising:
(a) combining sources of borate glass frit and aluminum to form a mixture;
(b) compacting said mixture to form a shape;
(c) heating said shape, whereby said sources react to form boride and alumina; and
(d) densifying said reacted shape.

Specific embodiments of the invention include the use of rare earth borate glasses such as $La_2O_3 \cdot 6 B_2O_3$ glass to form compositions containing rare earth boride and $Al_2O_3$ by reacting the borate glass with aluminum metal.

DETAILED DESCRIPTION OF THE INVENTION

The novel compositions of the invention comprise alumina and boride. The processes described below use borate glass precursor materials as a convenient source of boron and metal. It should be understood that the composite materials of the invention could also be made using separate sources of boron and metal.

In the preferred process for making ceramic compositions and sintered ceramic compositions of the invention, a powder mixture is formed from sources of the desired borate glass frit and aluminum metal. The mixture may then be reacted to form a boride-alumina composition.

If a sintered part is desired, the mixture is usually compacted into a shape before the reaction. The compact is heated under a small load to a temperature at which the glass frit flows. As the glass flows, the interstices between the aluminum particles are filled thereby increasing the density of the unreacted shape.

The shape is then reacted at a higher temperature to form the desired ceramic composition. The reacted shape would then be further heated to cause densification of the shape. Hot pressing or hot isostatic pressing may be used to facilitate the densification process.

The preferred process of the invention may also be used to form alumina/boride composites having rare earth borides or other borides by using the appropriate borate glass. The source of borate glass frit may be any glass having substantial amounts of boron oxide ($B_2O_3$). For embodiments using rare earth borates, the rare earth may be a single rare earth element or a combination of rare earths. A glass frit consisting essentially of $Re_2O_3 \cdot 6 B_2O_3$ is preferred. A specific embodiment of the preferred frit contains lanthanum as the rare earth metal. The average particle size of the glass frit is preferably about 25 microns or less.

Lanthanum borate frit may be prepared by milling the appropriate amounts of $La_2O_3$ and $B_2O_3$ to form a mixture. The mixture is then heated to form a melt. The heating time and temperature are preferably kept as low as possible to achieve a homogeneous melt while minimizing $B_2O_3$ volatilization. The molten mixture is formed into a friable glass ribbon which is crushed and milled to achieve the desired particle size.

The aluminum source may be any material providing aluminum available for reaction with the glass frit while not containing any undesirable constituents. A preferred source of aluminum is actual aluminum metal powder. The aluminum powder preferably has an average particle size on the same order as the glass frit (i.e., about 25 microns or less). A suitable aluminum powder is Alcan 5240 sold by the Alcan Company.

The glass frit and aluminum sources are combined to form a starting mixture. The sources can be combined using any known appropriate mixing technique. A removable binder may optionally be added to the mixture to facilitate molding the mixture into a shape. Further, compatible materials may be incorporated into the starting mixture and/or variations from the stoichiometry of the reaction may be made without departing from the scope of the invention. Cermets containing free aluminum can be generated if excess aluminum is incorporated into the starting mixture.

A preferred embodiment of the invention process uses hot press tooling and techniques. The starting powder mixture may be poured directly into a hot press die (typically made of graphite) and then compacted to form the initial shape. Alternatively, the starting powder mixture may be combined with a binder and subsequently be shaped into a preform. The preform would be placed into the die and be heated to remove the binder. In either case, the shape is then heated to cause glass flow (usually to about 650° C. for lanthanum borate glass frit). A small load is preferably applied to facilitate the glass flow. The modified shape is then further heated in the die to cause the desired reaction.

For lanthanum borate glass, the reaction can be described by the formula:

$$La_2O_3 \cdot 6 B_2O_3 + 14 Al \rightarrow 7 Al_2O_3 + 2 LaB_6.$$

This reaction is preferably completed somewhere between 650° C. and 1650° C. While the reaction refers to lanthanum hexaboride, other lanthanum borides may also be formed.

The reacted shape is then hot pressed in the die. For the lanthanum borate embodiment, the preferred hot pressing conditions are a temperature of about 1650°–1700° C. and a pressure of about 1000–1500 psi. These conditions are preferably maintained for at least one hour, thereby yielding a dense ceramic part.

It should be understood that the process of the invention is not limited to the use of hot pressing or the use of lanthanum borate glass frits.

The following examples are presented to illustrate specific embodiments of the invention. The invention is not limited to the materials, process steps or parameters recited in these examples.

EXAMPLE 1

Preparation of Lanthanum Borate Glass Frit

A lanthanum borate glass frit having the composition $La_2O_3 \cdot 6 B_2O_3$ was prepared by dry milling appropriate amounts of $La_2O_3$ and $B_2O_3$ for about two hours. The resultant mixture was then heated to about 1350° C. for ½ hour to form a homogeneous melt with minimum $B_2O_3$ volatilization. The molten mixture was then passed through a two-roll mill thereby forming a glass ribbon. The ribbon is then crushed and milled to achieve an average particle size of about 25 microns.

EXAMPLE 2

Preparation of Densified $Al_2O_3$-$LaB_6$

The borate glass frit from Example 1 was mixed with aluminum powder of a similar particle size (Alcan 5240) in approximately stoichiometric proportions according to the reaction:

$$La_2O_3 \cdot 6 B_2O_3 + 14 Al \rightarrow 7 Al_2O_3 + 2 LaB_6.$$

The mixture was placed into a graphite die which was loaded into a hot press. The mixture was heated to 650° C. at a rate of about 5° C./min. At 650° C., a small load was applied to the shape to aid in densification by glass flow into the interstices of the shape. After about ½ hour at 650° C., the temperature was raised to 1650° C. at a rate of 10° C./min. During this temperature increase the above reaction took place. At 1650° C., the temperature was held and a pressure of about 1500 psi was applied. Under those conditions, an $Al_2O_3$-$LaB_6$ sintered ceramic part was produced having a minimum density of about 4.16 g/cc or about 99–100% of theoretical density.

What is claimed is:

1. A method of producing a densified shape containing rare earth boride and alumina, said method comprising:
   (a) combining rare earth borate glass frit and aluminum to form a mixture;
   (b) compacting said mixture to form an unreacted shape;
   (c) heating said unreacted shape to a temperature adequate to cause said glass to flow but not adequate to cause reaction between said glass and said aluminum, thereby resulting in a modified unreacted shape of higher density than said unreacted shape of step (b);
   (d) further heating said modified shape, whereby said glass and aluminum react to form rare earth boride and alumina; and
   (e) densifying said reacted shape.

2. The method of claim 1 wherein pressure is applied to said shape during heating step (c) to facilitate said glass flow.

3. The method of claim 1 wherein said rare earth borate glass has the composition:

$$La_2O_3 \cdot 6 B_2O_3.$$

4. The method of claim 3 wherein said reacting includes the reaction:

$$La_2O_3 \cdot 6 B_2O_3 + 14 Al \rightarrow 7 Al_2O_3 + 2 LaB_6.$$

5. The method of claim 1 wherein said densifying step (e) is performed by hot pressing.

6. The method of claim 5 wherein said hot pressing is performed at a temperature of about 1650°–1700° C. and a pressure of about 1000–1500 psi.

7. The method of claim 2 wherein said temperature in heating step (c) is about 650° C.

8. The method of claim 6 wherein said shape is densified to at least about 99% of theoretical density in step (e).

* * * * *